United States Patent
Okamoto (10) Patent No.: US 7,990,430 B2
(45) Date of Patent: Aug. 2, 2011

(54) TIME-LAPSE PHOTOGRAPHING DEVICE

(75) Inventor: Takaaki Okamoto, Kanagawa (JP)

(73) Assignee: Nikon Corporation, Tokyo (JP)

( * ) Notice: Subject to any disclaimer, the term of this patent is extended or adjusted under 35 U.S.C. 154(b) by 378 days.

(21) Appl. No.: 12/292,213

(22) Filed: Nov. 13, 2008

(65) Prior Publication Data

US 2009/0079850 A1 Mar. 26, 2009

Related U.S. Application Data

(63) Continuation of application No. PCT/JP2007/059997, filed on May 9, 2007.

(30) Foreign Application Priority Data

May 15, 2006 (JP) ................................. 2006-135222

(51) Int. Cl.
*H04N 5/228* (2006.01)
(52) U.S. Cl. ........... 348/222.1; 348/207.99; 348/208.14; 348/169; 348/79
(58) Field of Classification Search .................... 348/79, 348/169, 207.99, 208.14, 222.1
See application file for complete search history.

(56) References Cited

U.S. PATENT DOCUMENTS

| 6,169,575 | B1 * | 1/2001 | Anderson et al. | ........... 348/231.2 |
| 7,515,823 | B2 * | 4/2009 | Sasaki et al. | ............... 348/221.1 |
| 2001/0030802 | A1 * | 10/2001 | Ooki et al. | .................... 359/385 |
| 2003/0044054 | A1 | 3/2003 | Olschewski et al. | ........... 382/128 |
| 2005/0282268 | A1 * | 12/2005 | Kagayama | ................. 435/288.7 |
| 2006/0171023 | A1 | 8/2006 | Kishida | |
| 2008/0240591 | A1 * | 10/2008 | Iizuka et al. | ................... 382/236 |

FOREIGN PATENT DOCUMENTS

| JP | 2002-335492 A | 11/2002 |
| JP | 2004-309719 A | 11/2004 |
| JP | 2005-234435 A | 9/2005 |
| JP | 2006-215260 A | 8/2006 |

* cited by examiner

*Primary Examiner* — Gevell Selby
(74) *Attorney, Agent, or Firm* — Morgan, Lewis & Bockius LLP (57) ABSTRACT

By comparing an image of an observation object (S) acquired at each photographing timing with a previous image acquired at a photographing timing that immediately precedes the photographing timing at which each image has been acquired, the determination as to whether or not there is a change from the previous image in the observation object (S) is performed for each image acquired at each photographing timing. Then, by adding predetermined identification information to either an image for which a change from the previous image in the observation object (S) has been determined to be present, or an image for which a change from the previous image in the observation object (S) has been determined to be absent, it is possible to extract only an image in which a change from the previous image in the observation object (S) is present from among the saved images, on the basis on the identification information.

8 Claims, 9 Drawing Sheets

IMAGE HAVING NO CHANGE
FROM PREVIOUS IMAGE

IMAGE HAVING A CHANGE
FROM PREVIOUS IMAGE

TIME-LAPSE PHOTOGRAPHING DEVICE

This is a continuation of PCT International Application No. PCT/JP2007/059997, filed May 9, 2007, which is hereby incorporated by reference. This application also claims the benefit of Japanese Patent Application No. 2006-135222, filed in Japan on May 15, 2006, which is hereby incorporated by reference.

TECHNICAL FIELD

The present invention relates to a time-lapse photographing device that photographs an observation object at intermittent photographing timings.

TECHNICAL BACKGROUND

A time-lapse photographing device has a configuration such that an observation object is photographed at intermittent photographing timings and an image of the observation object is acquired at each photographing timing, thereby making it possible to record images within an interval longer than that when the observation object is photographed as a dynamic image and perform reproduction within a short interval. In the time-lapse photographing device, the images obtained by photographing are usually directly saved, but when the observer is interested only in a change state of the observation object, saving the images within time intervals in which the observation object does not change becomes unnecessary. Accordingly, a device has been suggested (see Japanese Patent Application Laid-open No. 2004-309719) in which when the start operation of time-lapse photographing is performed, the actual photographing is not started, the photographing is started for the first time when the occurrence of a change in the observation object is detected, and the photographing is stopped when the observation object stops changing. With such a device, it is possible to view only the change state of the observation object by reproducing the saved images. Therefore, the processing speed of observation results can be greatly increased.

DISCLOSURE OF THE INVENTION

Problems to be Solved by the Invention

When the observation object is a cell, small changes sometimes occur before and after significant changes in the cell, and it is preferred that these small changes could be also picked up in time-lapse photographing and viewed thereafter. However, with a configuration in which the photographing is started (or restarted) by detecting the occurrence of a change in the observation object, as in the device described in the aforementioned patent document, there is a period in which the observation object is not photographed and a disadvantageous situation can occur such that these very small changes cannot be thereafter viewed even if they are wished to be viewed.

The present invention was created with consideration for the above-described problem, and it is an object of the present invention to provide a time-lapse photographing device of a configuration that enables viewing not only the state change of the observation object by image reproduction, but also the state before and after the change in the observation object by the reproduced images.

Means to Solve the Problems

The time-lapse photographing device in accordance with the present invention comprises: a photographing element that photographs an observation object; an image acquisition unit that controls the photographing element, performs time-lapse photographing intermittently with a predetermined standby time, and acquires a plurality of images at each photographing timing of the time-lapse photographing; an image change determination unit that compares an image at the present photographing timing when the image is acquired by the image acquisition unit with an image at a previous timing, thereby determining whether or not there is a change in the acquired image; an image extraction unit that extracts at least one representative image from among a group of images for which the presence of a change in the image of the observation object has been determined by the image change determination unit and extracts at least one representative image from among a group of images for which the absence of a change in the image of the observation object has been determined; and an image memory that saves, separately for each of the photographing timings, an image at each of the photographing timings extracted by the image extraction unit.

The time-lapse photographing device preferably comprises an identification information addition unit to add predetermined identification information to either an image for which a change in the observation object has been determined to be present by the image change determination unit, or an image for which a change in the observation object has been determined to be absent.

Further, the time-lapse photographing device preferably comprises an image reproduction unit that extracts an image having a change from the previous image from among the images saved in the image memory based on the identification information added to the image and continuously reproduces only the images that have a change from the previous image in the order of photographing time of the observation object.

In the time-lapse photographing device, the image reproduction unit preferably has a first reproduction mode of reproducing only an image having the identification information added thereto and a second reproduction mode of reproducing an image extracted under conditions different from those of the first reproduction mode.

In the time-lapse photographing device, the image extraction unit preferably extracts all images from a group of images for which the presence of a change in the observation object has been determined by the image change determination unit.

In the time-lapse photographing device, the image change determination unit successively determines a change in the plurality of images; and the image extraction unit extracts an image at a point of time the change is determined to be present and completes a next operation of the image acquisition unit and the image change determination unit.

Advantageous Effects of the Invention

The time-lapse photographing device of the above-described configuration enables viewing not only the state change of the observation object by image reproduction, but also the state before and after the change in the observation object by the reproduced images.

DESCRIPTION OF THE PREFERRED EMBODIMENT

Figure 1:
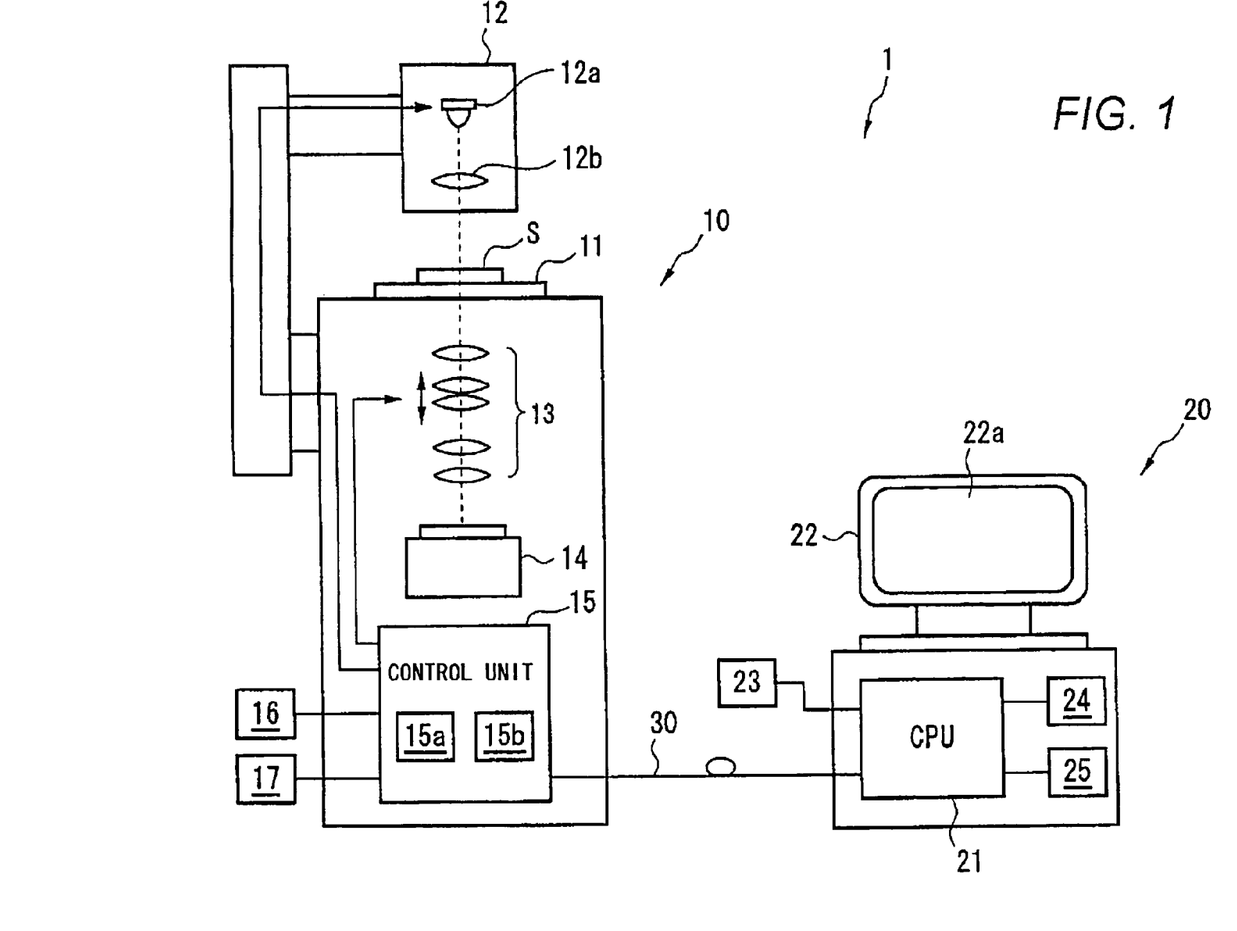
FIG. 1 is a schematic drawing of the time-lapse photographing device of one embodiment of the present invention.

The preferred embodiments of the present invention will be described below with reference to the appended drawings. FIG. 1 illustrates an example in which the time-lapse photographing device of an embodiment of the present invention is applied to a microscope. In the present embodiment, a time-lapse photographing device 1 comprises a microscope 10 as an image acquisition means having a time-lapse photographing function, identification information addition means for adding the below-described predetermined identification information to the image acquired by time-lapse photographing performed by the microscope 10, image saving means for performing saving of the acquired image, a personal computer 20 serving as image reproduction means for performing reproduction processing of the saved image, and a communication cable 30 connecting the microscope 10 and personal computer 20.

The microscope 10 has an illumination device 12 composed of a LED 12a and a collector lens 12b above a stage 11 and also has an image-forming lens group 13 and a CCD 14 as photographing means below the stage 11. Illumination light emitted from the LED 12a is collected by the collector lens 12b and then illuminates an observation object S placed on the stage 11. An image of the observation object S illuminated by the illumination light from the LED 12a is formed on a light-receiving surface of the CCD 14 via the image-forming lens group 13, and the image of the observation object S formed on the light-receiving surface of the CCD 14 is converted into an electric signal and sent to a control unit 15 located within the microscope 10. The control unit 15 converts the electric signal sent from the CCD 14 into image data and sends the image data via the communication cable 30 to a CPU 21 of the personal computer 20. The CPU 21 of the personal computer 20 generates an image signal from the image data sent by the control unit 15 and displays the image of the observation object S on a display 22.

The microscope 10 is provided with a magnification adjustment knob 16 and a brightness adjustment knob 17. Where the magnification adjustment knob 16 is operated, the control unit 15 moves some lenses constituting the image-forming lens group 13 in the optical axis direction of the LED 12a correspondingly to the operation amount of the magnification adjustment knob. As a result, the projection magnification of the observation object S on the CCD 14 changes and the size of the observation object S that has been image displayed on the display 22 changes. Further, where the brightness adjustment knob 17 is operated, the control unit 15 adjusts a voltage of the LED 12a correspondingly to the operation amount of the brightness adjustment knob, and the brightness of the illumination light emitted from the LED 12a changes.

The input of initial conditions (standby time, time-lapse photographing continuation time, and number of shots) for the microscope 10 to perform time-lapse photographing and a start command operation of time-lapse photographing can be performed on the display 22 by using an input device 23 such as a mouse or a keyboard connected to the personal computer 20 (on a display screen 22a where display is performed based on software that has been read into the CPU 21 of the personal computer 20). The contents of initial conditions inputted from the input device 23 is sent via the communication cable 30 to the control unit 15 located within the microscope 10 and stored in a storage unit 15a of the control unit 15. The standby time as referred to herein is a time spacing between intermittent photographing timings in time-lapse photographing, and the number of shots is the number of images of the observation object S acquired at each photographing timing.

Figure 2:
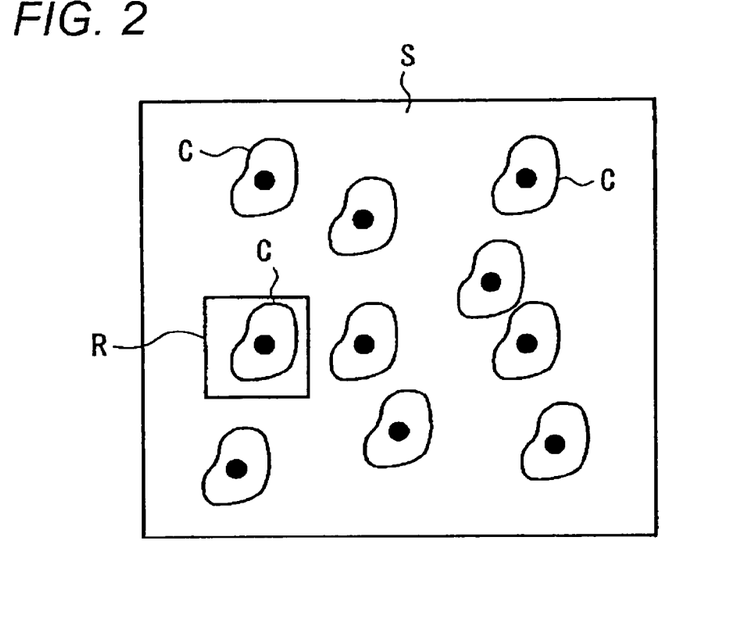
FIG. 2 shows a state in which a region including one cell is designated as an observation region in the case in which an observation object is composed of a plurality of cells.

In the time-lapse photographing device 1, an observation region that is of interest to an observer is designated as a region for determining whether the observation object S has changed. The designation of the observation region is performed, for example, by region designating a portion of the image of the observation object S displayed in real time on the display 22, by using the input device 23 such as a keyboard. Data of the designated observation region are stored in an internal memory 24 of the personal computer 20, but it is preferred that the observation region could be changed even after the time-lapse photographing is started. For example, when the observation object S is a preparation or the like composed of a plurality of cells, a region including one cell or a plurality of cells can be designated as the observation region. FIG. 2 shows a state in which a region including one cell C is designated as an observation region R in the case the observation object S is composed of a plurality of cells C.

Where a start command operation of time-lapse photographing is performed from the input device 23 of the personal computer 20, the operation signal is inputted via the communication cable 30 into the control unit 15 located within the microscope 10. Where the control unit 15 receives the start command operation signal of time-lapse photographing, the control unit starts the time-lapse photographing based on the above-described initial conditions that have been set in advance. Thus, the observation object S is successively photographed after waiting for the preset standby time to elapse, and when a value equal to or larger than two has been set as the number of shots in the initial conditions, photographing is continuously repeated at a predetermined interval time for the number of times equal to this preset number of shots. This photographing process is repeated until the time-lapse continuing time elapses. A value much smaller than the time spacing (that is, standby time) between photographing timings is set as the interval time in the case a value equal to or larger than two has been set for the number of shots (it is preferred that the interval time can be changed at random).

When the control unit 15 located within the microscope 10 performs the time-lapse photographing, the standby time and interval time are measured based on the incorporated clock 15*b*. Further, the LED 12*a* is turned on and off by the control unit 15 located within the microscope 10, and the control unit 15 turns on the LED 12*a* only when the time-lapse photographing is performed.

The images of the observation object S at each photographing timing that have been obtained by the time-lapse photographing are sent via the communication cable 30 to the personal computer 20 and stored in the internal memory 24. By comparing an observation region in an image of the observation object S stored in the internal memory 24 with an observation region of an image (called "previous image") that has been acquired at a photographing timing immediately preceding the photographing timing at which this image has been acquired, the CPU 21 of the personal computer 20 determines whether or not there is a change from the previous image in the observation object S. Then, predetermined identification information is added to either one from among an image for which a change from the previous image in the observation object S has been determined to be present and an image for which a change from the previous image in the observation object S has been determined to be absent, and these images are saved in an image storage unit (for example, hard disk) 25 connected to the CPU 21. The aforementioned identification information that is added to the image (image data) can have any contents and form, provided that it is information that makes it possible to identify an image for which there is a change from the previous image in the observation object S. For example, the identification information may be a predetermined mark (row of symbols or the like) attached (stamped) in a corner of the photographed image, or a predetermined row of symbols added to the data file in which image information such as the time at which the shot was made is described.

With the above-described process, images of the observation object S that have been acquired at each photographing timing are successively saved in the image storage unit 25, and upon completion of photographing, data composed of a series of images obtained by time-lapse photographing are formed, but this series of image data includes a mixture of images to which identification information has been added and images to which identification information has not been added. After the process of determining whether or not there is a change from the previous image in the observation object S has been completed, the previous image is deleted from the internal memory 24 to ensure a space for storing images photographed in the next photographing timing.

Here, when the CPU 21 of the personal computer 20 compares an image in each photographing timing that has been stored in the internal memory 24 with an image in the adjacent photographing timing and determines whether or not there is a change from the previous image in the observation object S (more specifically, in the observation region), as described above, a criterion for such determination can be not only the case in which the change amount of luminance in portions corresponding to both images exceeds a predetermined value that has been set in advance, but also a case in which a change amount of surface area (for example, when the observation object S is a cell, the surface area of a region surrounded by an outer edge of the internal portion of the cell) occupied on the screen by a physical object present in the observation region exceeds a predetermined value that has been set in advance. When the presence of a change in the image is determined based on the change amount of surface area, the CPU 21 has to be configured to be capable of recognizing the shape of a physical object in advance from an image picked up within the observation region and calculating the surface area of the region surrounded by this shape, but the accuracy of detecting whether or not the image has changed can be increased by comparison with the case in which whether or not the image has changed is determined base don the change amount of brightness.

Figure 3:
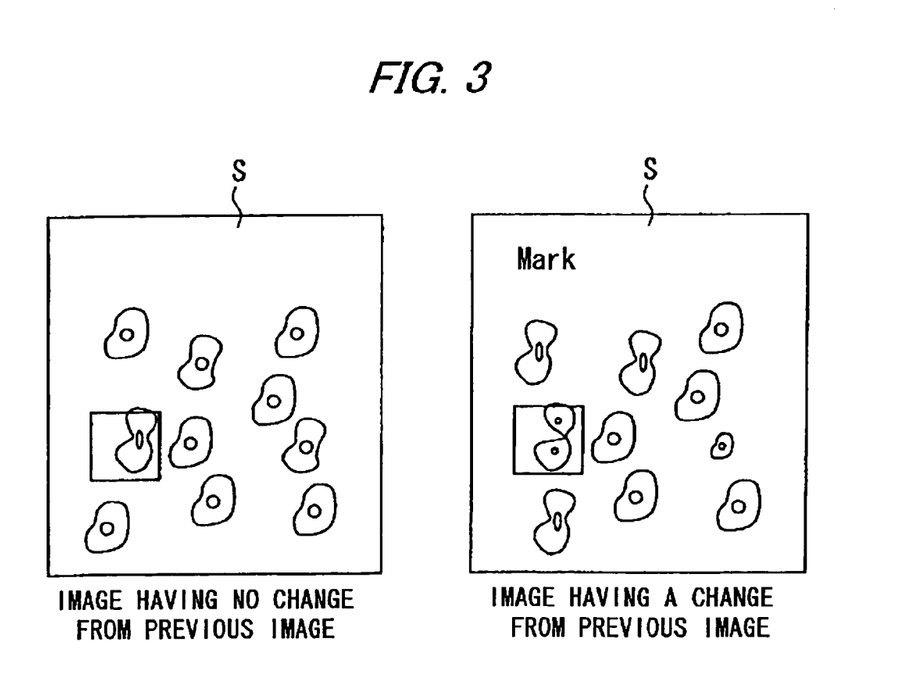
FIG. 3 shows an example relating to the case in which a mark "Mark" is attached to an image in which a change from the previous image is present in the observation object.
Figure 4:
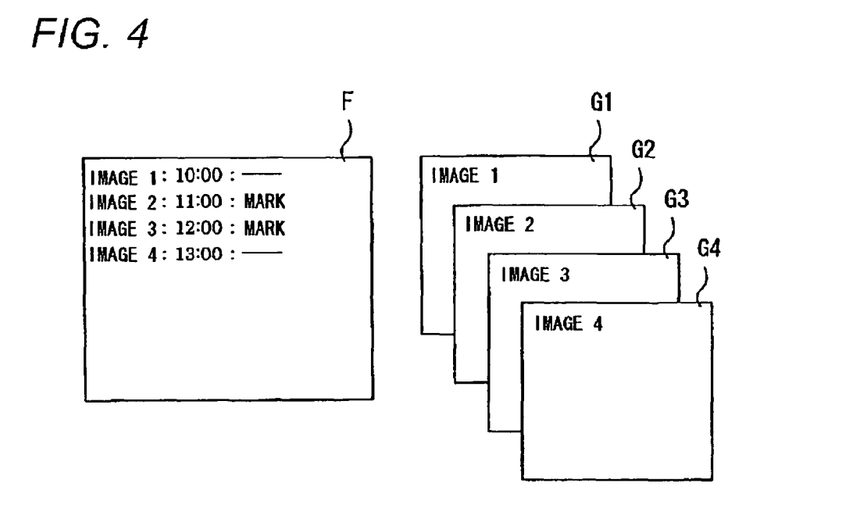
FIG. 4 shows an example relating to the case in which a row of letters "Mark" is added to a column corresponding to an image in which a change from the previous image is present in the observation object.

FIG. 3 and FIG. 4 illustrate a state in which identification information is attached to each image. FIG. 3 shows an example relating to the case in which a mark "Mark" is attached to (embedded in) the image having a change from the previous image in the observation object S, and FIG. 4 shows an example relating to the case in which a change from the previous image has been found in an image G2 and an image G3, from among a series of images including image G1, image G2, image G3, and image G4, and therefore a row of letters "Mark" is added to the columns of image G2 and image G3 in the data file F including the image information such as image name information and photographing time information.

Figure 5:
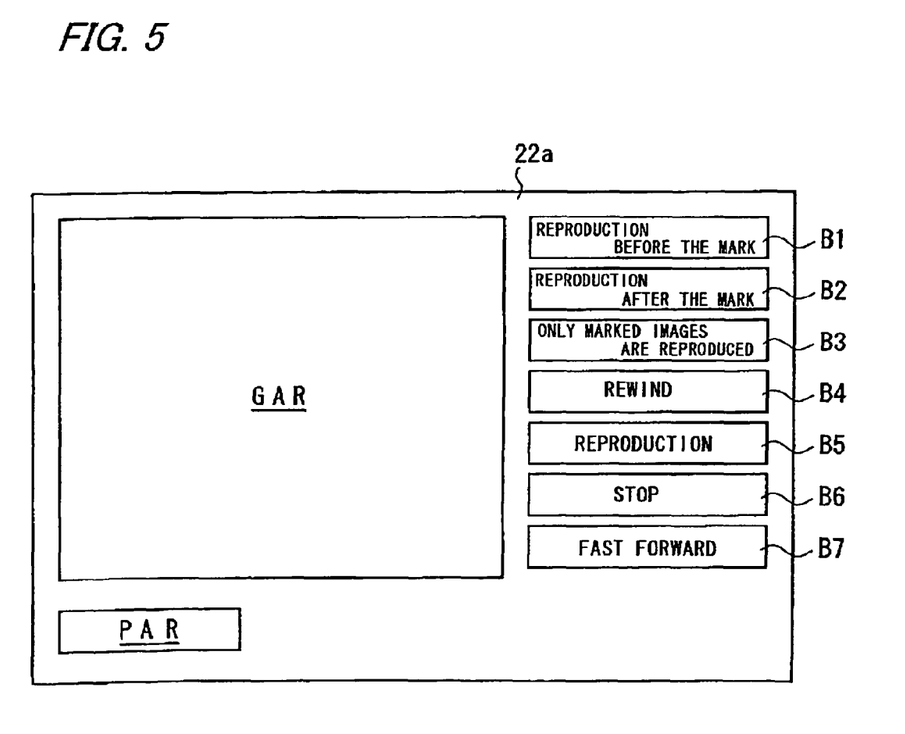
FIG. 5 illustrates the first example of an image display form at the time a reproduced image is displayed on the display screen.

FIG. 5 illustrates the first example of an image display form at the time a reproduced image is displayed on the display screen 22*a*. Here, a mark is assumed to be attached as identification information to an image in which a change from the previous image is present in the observation object S. In this example, a reproduced image display region GAR is present on the left side of the display screen 22*a*, and the reproduced image is displayed therein. A plurality of buttons that can be click operated by a mouse are arranged side by side in the up-down direction on the right side from the reproduced image display region GAR, these buttons including, from top to bottom, a "Reproduction Before the Mark" button B1, a "Reproduction After the Mark" button B2, a "Only Marked Images are Reproduced" button B3, a "Rewind" button B4, a "Reproduction" button B5, a "Stop" button B6, and a "Fast Forward" button B7. Further, a change amount display region PAR is provided on the left side below the reproduced image display region GAR, and the change amount corresponding to the reproduced image that is presently displayed in the reproduced image display region GAR is displayed herein. For example, when the observation object S is a cell, the change amount is a ratio of the surface area of the cell on the screen at the present timing to the surface area of the cell on the screen at a timing in which the time-lapse photographing has been started. The CPU 21 can automatically calculate and display the change amount by indicating the contour of the cell present in the observation region with a mouse or the like when the observation region is set.

Here, when the "Reproduction Before the Mark" button B1 is operated, the CPU 21 of the personal computer 20 successively reproduces and displays all the images in the forward direction (forward direction with respect to the time elapsed when the time-lapse photographing is performed) from the reproduced image that is presently displayed on the display screen 22*a* (when no reproduced image is presently displayed on the display screen 22*a*, from the very first image in a series of images that have been acquired) to the very first marked image that is the closest thereto in time (the closest in time in the order of photographing). Further, when the "Reproduction After the Mark" button B2 is operated, all the images are reproduced and displayed in the forward direction from the marked image that is the closest in time to the reproduced image that is presently displayed on the display screen 22a. When the "Only Marked Images are Reproduced" button B3 is operated, only marked images are extracted from a series of acquired images and the extracted images are reproduced and displayed in the forward direction. When the "Rewind" button B4 is operated, all the images are reproduced and displayed in the reverse direction (reverse direction with respect to the time elapsed when the time-lapse photographing is performed) from the reproduced image that is presently displayed on the display screen 22a. When the "Reproduction" button B5 is operated, all the images are reproduced and displayed in the forward direction from the reproduced image that is presently displayed on the display screen 22a. When the "Stop" button B6 is operated, the presently performed display and reproduction of images are stopped. When the "Fast Forward" button B7 is operated, all the images are reproduced and displayed in a fast forward mode in the forward direction from the reproduced image that is presently displayed.

Figure 6:
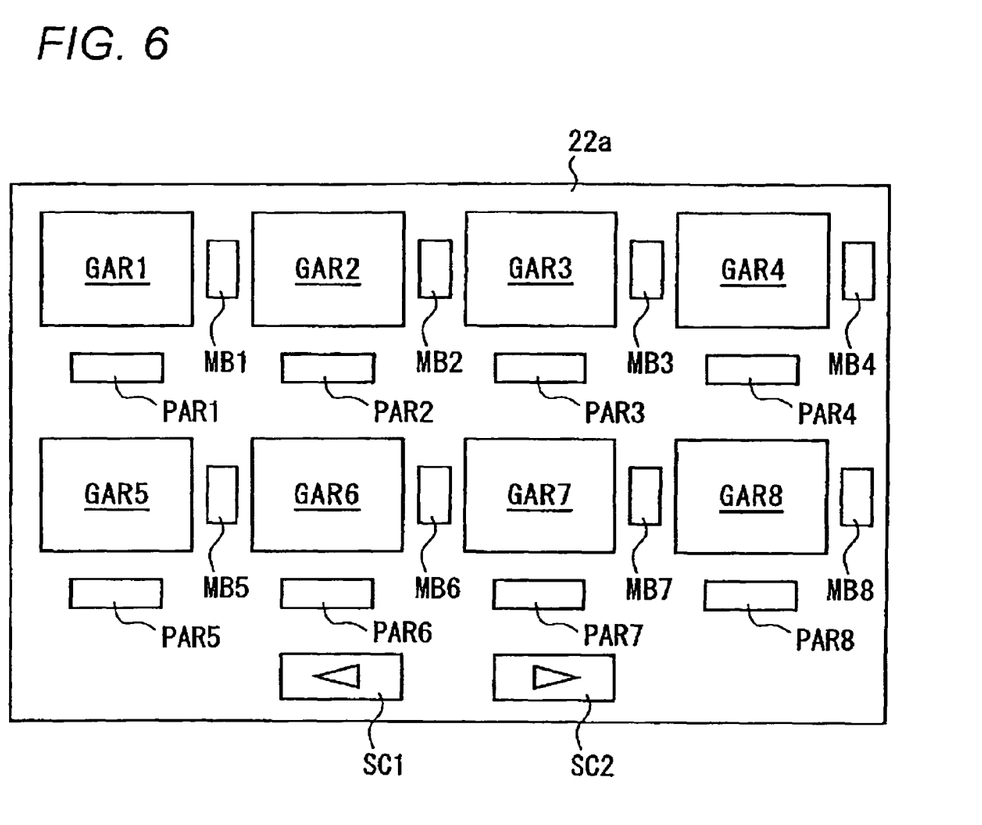
FIG. 6 illustrates the second example of an image display form at the time a reproduced image is displayed on the display screen.

FIG. 6 illustrates the second example of the image display form when reproduced images are displayed on the display screen 22a. Here, a mark is also assumed to be attached as identification information to an image that has a change from the previous image in the observation object S. In this example, a total of 8 reproduced image display regions GAR1, GAR2, . . . , GAR8 arranged in 4 columns and 2 rows within the display screen 22a are provided side by side in the order of upper left→upper right→lower left→lower right, and the marked reproduced images (that is, images that have been determined to have a change from the previous image) are displayed side by side in the forward direction in these 8 reproduced image display regions GAR1, GAR2, . . . , GAR8. Other images positioned before and after these images can be viewed by operating scroll buttons SC1, SC2. Images located between the marked images can be viewed by operating buttons MB1, MB2, . . . , MB8 located between the adjacent reproduced image display regions. In this case, images located between two marked images (called intermediate images) are displayed side by side in the forward direction in the reproduced image display regions GAR1, GAR2, . . . , GAR8 (in the order of upper left→upper right→lower left→lower right). Even when the number of intermediate images is eight or more and all the intermediate images are not displayed in the reproduced image display regions GAR1, GAR2, . . . , GAR8, it is possible to view images other than the presently displayed images by operating the scroll buttons SC1, SC2. Change amount display regions PAR1, PAR2, . . . PAR8 where variation amounts corresponding to the display images (explained in the above-described example) are displayed are provided below eight reproduced image display regions GAR1, GAR2, . . . , GAR8 respectively.

In the time-lapse photographing device 1, the number of shots, that is, the number of images of the observation object S that are acquired at each photographing timing can be set as an initial condition to a plurality of values, as described hereinabove. When the number of shots is set as an initial condition to 1, the determination as to whether or not there is a change from the previous image in the observation object S that is performed by the CPU 21 is carried out based only on comparison of one image acquired at the present photographing timing and one image acquired at the previous photographing timing, but when the number of shots is set to a plurality of values, the determination as to whether or not there is a change from the previous image in the observation object S is performed based on comparison of a plurality of images acquired at the present photographing timing and one representative image (the selection of the representative images is described below) selected from among a plurality of images acquired at the previous photographing timing. For example, when the number of shots is set to 3, each of the three images acquired at the present photographing timing (the photographing timings of these three images are shifted from each other by the below-described interval time) is compared with one representative image selected from among the three images acquired in the previous photographing timing, and the determination is based on the three comparisons. As a result, the change in the observation object S can be easily grasped and the determination as to whether or not a change has occurred in the observation object S can be performed more adequately.

Where the number of shots is set to a plurality of values, as described hereinabove, a plurality of images are acquired at each photographing timing, but saving all the images acquired at each photographing timing is undesirable because it unnecessarily decreases the usable capacity of the image storage unit 25, and when all of a plurality of images acquired at each photographing timing show no changes from the previous images, only one image selected from among a plurality of acquired images is selected and saved as a representative image. However, when some of a plurality images acquired at each photographing timing has changes from the previous image, all the acquired images may be saved in addition to selecting one representative image from among the images having a change from the previous images (for comparison with the image that will be acquired at the photographing timing of the next cycle). When some of a plurality of images acquired at each photographing timing have changes from the previous image in the observation object S, it is also possible to save only one representative object, but when a change in the observation object S is considered, images preceding and following this change are often very important in subsequent observations. Therefore, saving other images, rather than only the representative image, would be beneficial because it enables detailed observations of the change state of the observation object S by the image reproduction. Any method for selecting a representative image from a plurality of images can be used, but it is preferred, for example, that an image with the highest sharpness of the entire image, or an image that was the last to be acquired at the photographing timing be selected as the representative image.

Figure 7:
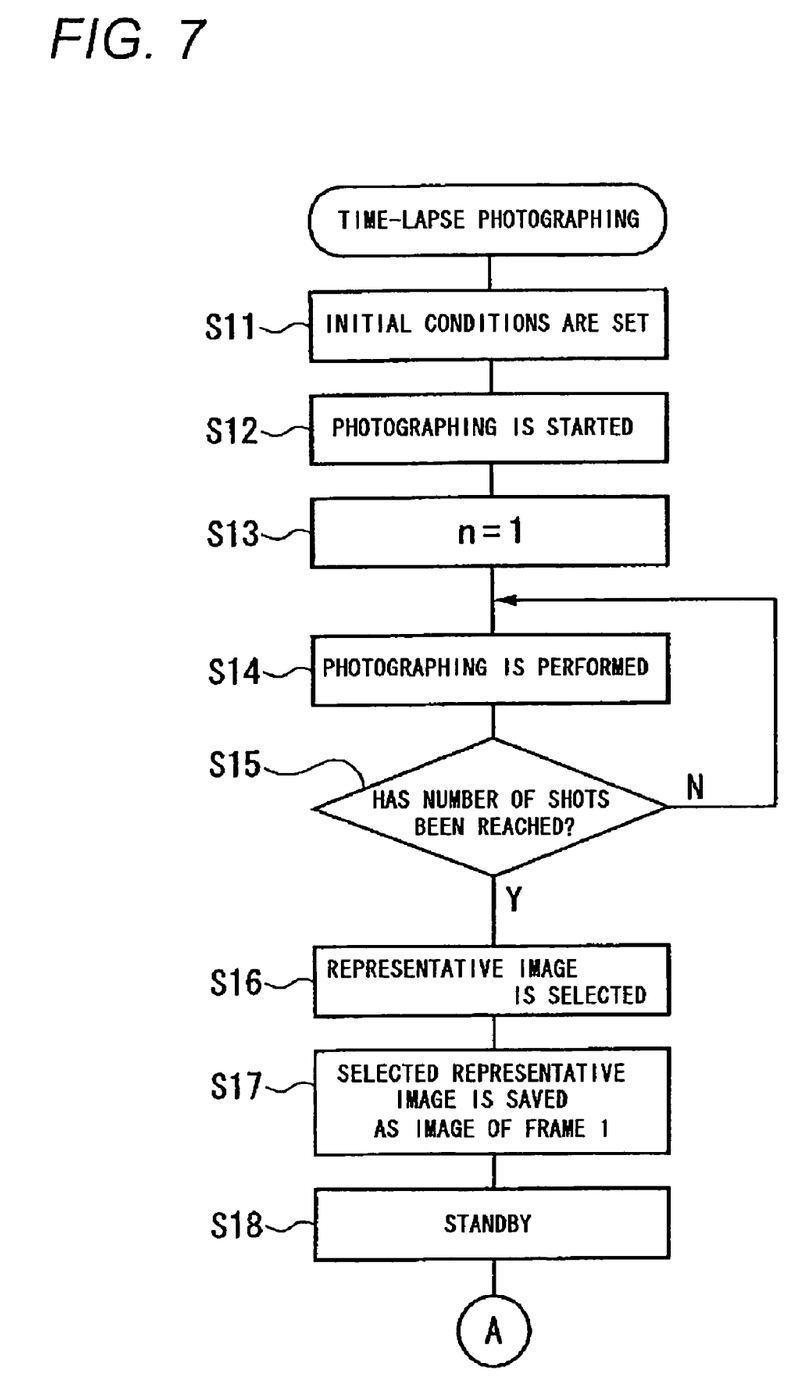
FIG. 7 is a front-stage portion of a flowchart illustrating the first example of a procedure for time-lapse photographing the observation object by using the time-lapse photographing device.
Figure 8:
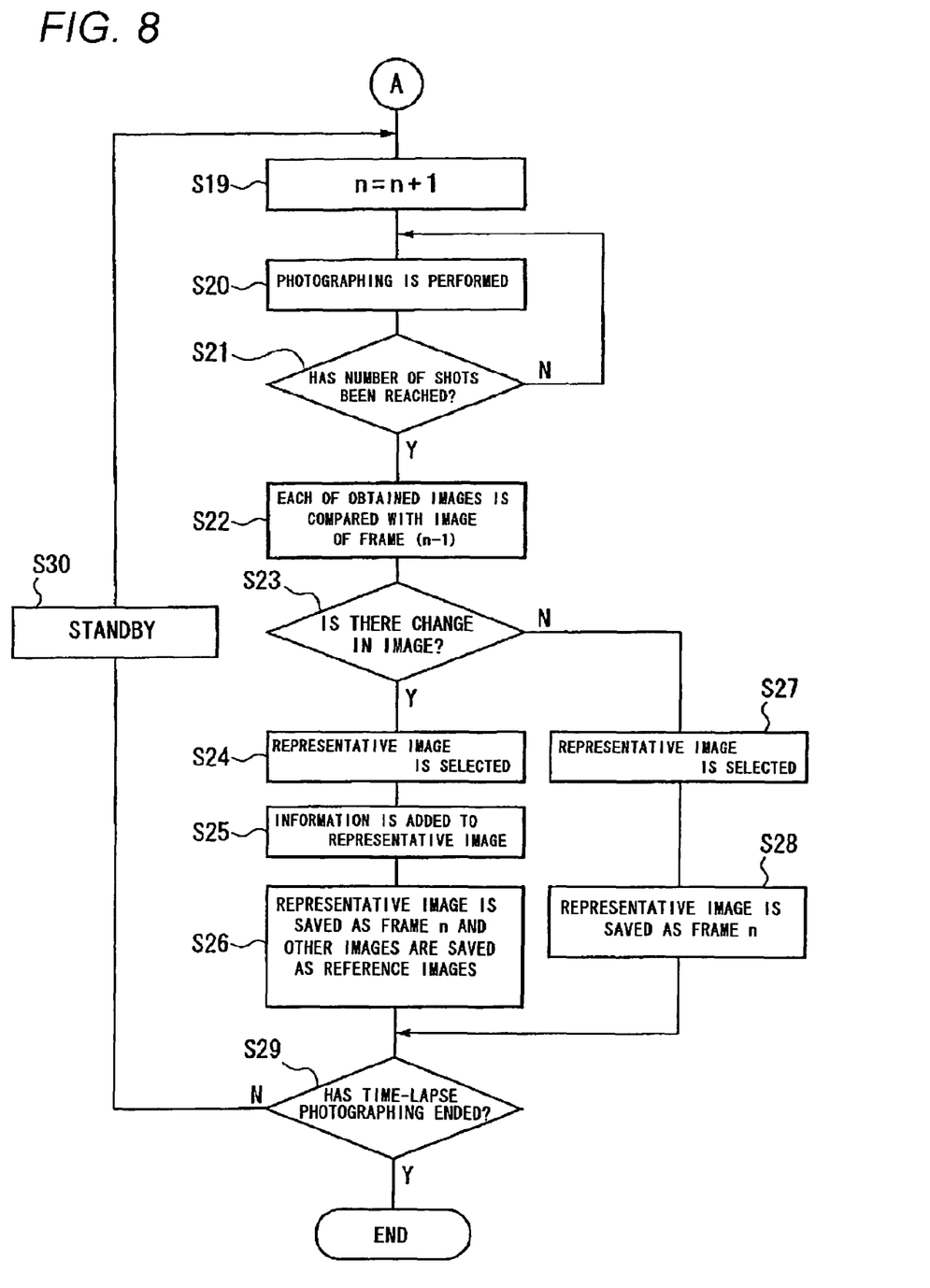
FIG. 8 is a rear-stage portion of a flowchart illustrating the first example of a procedure for time-lapse photographing the observation object by using the time-lapse photographing device.

A first example of a procedure of time-lapse photographing the observation object S by using the time-lapse photographing device 1 will be explained below based on a flowchart shown in FIG. 7 and FIG. 8. Encircled letters in FIG. 7 and FIG. 8 indicate that the flowchart continues in the sections marked by the same letter.

In the time-lapse photographing procedure of the first example, first, the observation object S is placed on the stage 11, and setting of initial conditions (standby time, time-lapse photographing continuation time, and number of shots) is performed from the input device 23 of the personal computer 20 (step S11). Once the setting of initial conditions has ended, a start command operation of time-lapse photographing is performed from the same input device 23. As a result, the control unit 15 of the time-lapse photographing unit 10 starts the time-lapse photographing (step S12). The control unit 15 initially introduces 1 in a frame number n (step S13) and performs photographing of the observation object S (step S14). Once the photographing of the observation object S has been performed, it is determined whether or not the number of taken shots has reached the number of shots that has been set as the initial condition (step S15). When it is determined that the number of taken shots has not reached the preset number of shots, the processing flow returns to step S14 and photographing is performed, and when it is determined that the predetermined number of shots has been reached, a representative image is selected from among the number of images equal to the number of shots that are obtained in the steps S13 to S14 (step S16). The selected representative image is then saved as an image of frame 1 (step S17). Once step 17 is completed, the processing stands by till the next photographing timing comes (step S18).

Once the standby time has elapsed (the time that elapsed from the completion of step S14 has reached the predetermined standby time) and the next photographing timing has come, 1 is added to the frame number n (step S19) and photographing of the observation object S is performed (step S20). Then, it is determined whether or not the number of taken shots has reached the number of shots set as the initial condition (step S21). When it is determined that the number of taken shots has not reached the preset number of shots, the processing flow returns to step S20 and photographing is performed. On the other hand, when it is determined in step S21 that the number of shots has been reached, the photographing is completed, and each of the images obtained in steps S20 to S21 the number of which is equal to the number of shots is compared with an image of frame (n−1) (step S22). Then it is determined for each of the images as to whether or not there is a change from the previous image (image of frame (n−1)) in the observation object S (step S23). When it is determined that a change from the previous image is present in the observation object S for any of a plurality of images, at least one representative image is selected from the obtained images the number of which is equal to the number of shots (step S24). After identification information has been added to image data of the representative image (step S25), the representative image is saved as an image of frame n and the remaining images (images other than the representative image) are saved as reference images (step S26). On the other hand, when it is determined in step S23 that a change from the previous image (image of frame (n−1)) is absent in all the images obtained in steps S20 to S21, at least one representative image is selected from the obtained images the number of which is equal to the number of shots (step S27) and the representative image is saved as an image of frame n (step S28). The presence or absence of changes from the previous image can be determined by a variety of well-known methods, for example, from the change amount of the shape change found by contour extraction of the observation object S or from the change amount of luminance of the image. Further, the "representative image" selected in step S24 may be one image with the largest change from the previous image or three images demonstrating maximum, minimum, and intermediate change from the previous image. Further, the "representative image" selected in step 27 is not limited to one image and may be several images.

Once step S26 or step S28 have ended, it is determined whether or not the time-lapse photographing continuation time that has been set as the initial condition has elapsed from the start of time-lapse photographing (step S29). When it is determined that the preset time-lapse photographing continuation time has not yet elapsed since the start of time-lapse photographing, the processing stands by till the next photographing timing comes to continue the time-lapse photographing (step S29). Once the time elapsed since the initial step S20 ended has reached the present standby time, the processing flow returns to step S19 and steps of photographing the observation object S and saving the images (steps S19 to S28) are repeated. On the other hand, when it is determined in step S29 that a preset time-lapse photographing continuation time has elapsed since the start of time-lapse photographing, the continuous time-lapse photographing process is ended.

Figure 9:
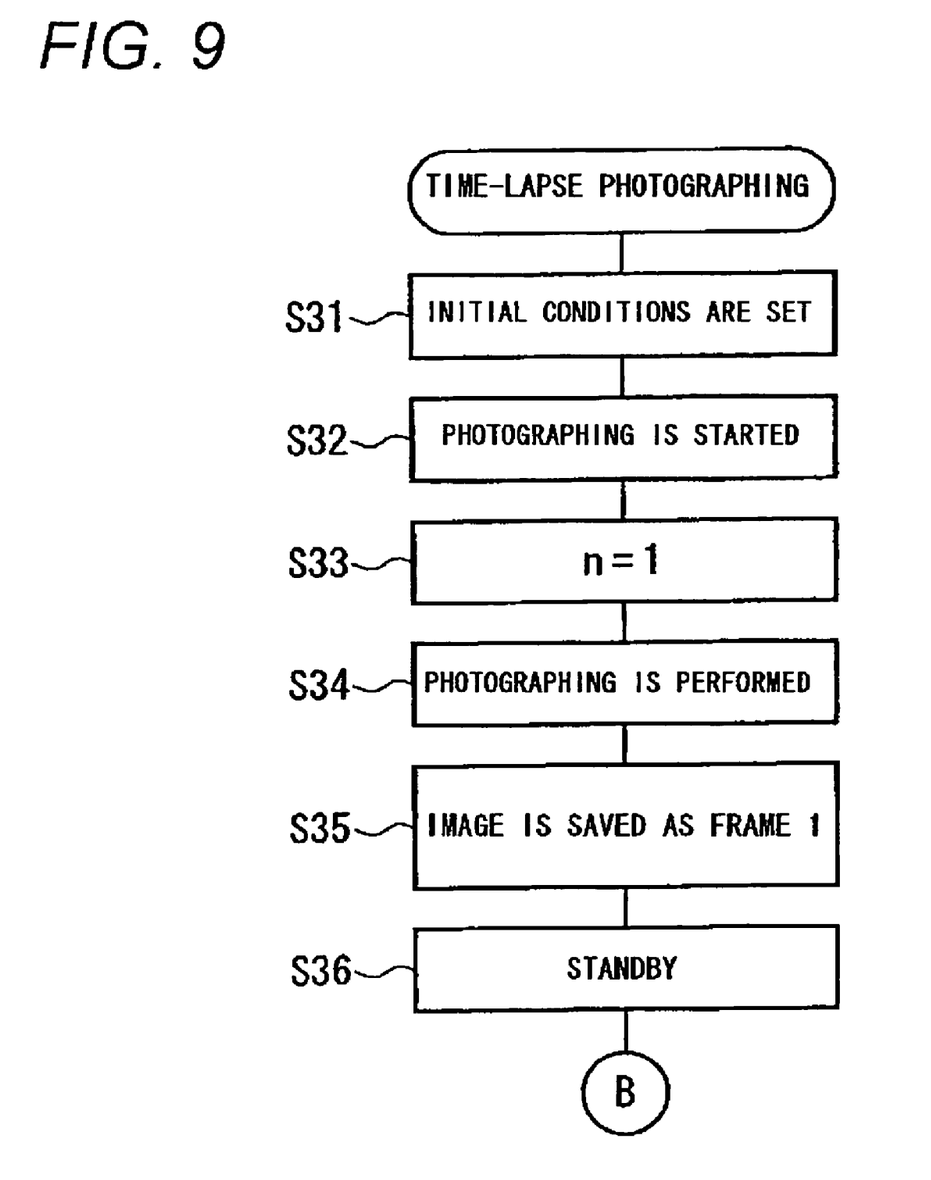
FIG. 9 is a front-stage portion of a flowchart illustrating the second example of a procedure for time-lapse photographing the observation object by using the time-lapse photographing device.
Figure 10:
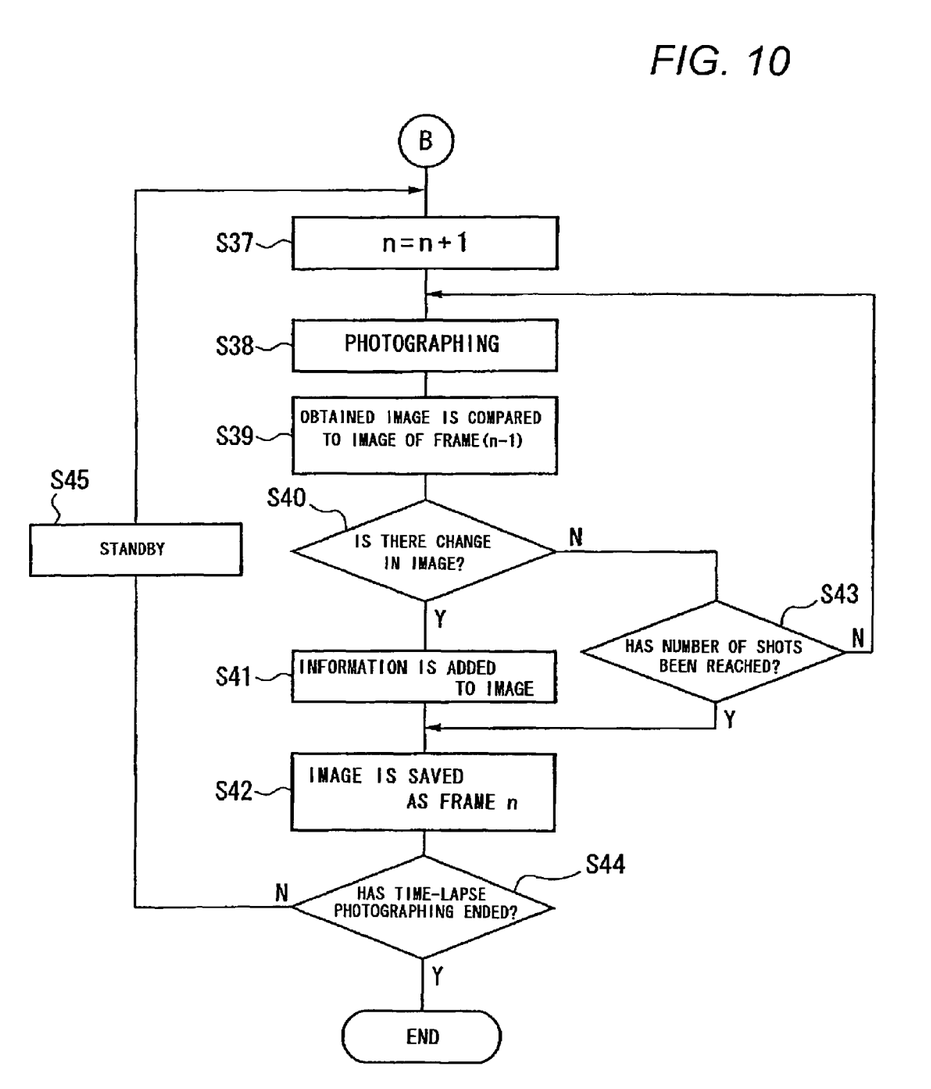
FIG. 10 is a rear-stage portion of a flowchart illustrating the second example of a procedure for time-lapse photographing the observation object by using the time-lapse photographing device.

A second example of a procedure of time-lapse photographing the observation object S by using the time-lapse photographing device 1 will be explained below based on a flowchart shown in FIG. 9 and FIG. 10. Encircled letters in FIG. 9 and FIG. 10 indicate that the flowchart continues in the sections marked by the same letter.

In the time-lapse photographing procedure of the second example, first, the observation object S is placed on the stage 11, and setting of initial conditions (standby time, time-lapse photographing continuation time, and number of shots) is performed from the input device 23 of the personal computer 20 (step S31). Once the setting of initial conditions has ended, a start command operation of time-lapse photographing is performed from the same input device 23. As a result, the control unit 15 of the time-lapse photographing unit 10 starts the time-lapse photographing (step S32). The control unit 15 initially introduces 1 in a frame number n (step S33) and performs photographing of the observation object S (step S34). The image obtained is saved as an image of frame 1 (step S35). Once step S35 has ended, the processing stands by till the next photographing timing comes (step S36).

Once the standby time has elapsed (the time that elapsed from the completion 6f step S34 has reached the predetermined standby time) and the next photographing timing has come, 1 is added to the frame number n (step S37) and photographing of the observation object S is performed (step S38). Then, the image obtained in step S38 is compared with an image of frame (n−1) (step S39) and it is determined for each of the images as to whether or not there is a change from the previous image (image of frame (n−1)) in the observation object S (step S40). When it is determined that a change from the previous image is present in the observation object S, identification information is added to image data of the image obtained in step S38 (step S41) and this image is saved as an image of frame n (step S42). On the other hand, when it is determined in step S40 that a change from the previous image is absent in the observation object S, it is then determined whether or not the number of taken shots has reached the number of shots that has been set as the initial condition (step S43). When it is determined that the number of taken shots has not reached the preset number of shots, the processing returns to step S38 and photographing is performed, and when it is determined that the number of shot has been reached, the photographing is ended, and the image obtained in the initial step S38 is saved as an image of frame n (step S42). In steps S40, S41, the change of the acquired image is successively determined by comparison with respective previous images, an image at the point of time the presence of a change has been determined is extracted and only this image is saved. At the same time, the operation is ended at the time-lapse photographing timing (image acquisition of CCD 14 is ended, and the operation of determining the image change of step S40 in the control 15 and CPU 21 are ended), and the processing stands by till the next time-lapse photographing timing (step S45).

Once step S42 has ended, it is determined whether or not the time-lapse photographing continuation time that has been set as the initial condition has elapsed from the start of time-lapse photographing (step S44). When it is determined that the preset time-lapse photographing continuation time has not yet elapsed since the start of time-lapse photographing, the processing stands by till the next photographing timing comes to continue the time-lapse photographing (step S45). Once the time elapsed since the initial step S38 ended has reached the present standby time, the processing flow returns to step S37 and steps of photographing the observation object S and saving the images (steps S37 to S42) are repeated. On the other hand, when it is determined in step S44 that a preset time-lapse photographing continuation time has elapsed since the start of time-lapse photographing, the continuous time-lapse photographing process is ended.

A procedure for continuously reproducing only those images in which a change from the previous image is present in the observation object S from among the images of the observation object S that have been obtained with the time-lapse photographing device 1 will be explained below using the flowchart shown in FIG. 11. The procedure of image reproduction processing shown herein is equivalent to the procedure of image reproduction in the case the "Reproduction" button B5 shown in the explanation of the first example of the above-described image display mode (see FIG. 5) is operated.

In this image reproduction procedure, first, a start command operation of image reproduction, that is, the operation of the "Reproduction" button B5 is performed by using the input device 23 from upon the display screen 22a shown in FIG. 5 (step S51). As a result, the CPU 21 of the personal computer 20 substitutes 1 in the frame number n (step S52) and then loads an image of frame 1 from the image storage unit 25 into the internal memory 24 (step S53). Then, it is decided where or not a mark that serves as identification information is attached to the loaded image of frame 1 (step S54). When it is determined that the mark has been attached, this image is displayed in the reproduced image display region GAR of the display screen 22a (step S55). In this case, the change amount corresponding to the displayed image is also displayed in the change amount display region PAR. On the other hand, when it is determined in step S54 that the mark serving as the identification information has not been attached to the image of the loaded frame n (here, n=1), 1 is added to the frame number n (step S56) and the processing returns to step S53.

Once a predetermined interval has passed since the image was displayed on the display screen 22a in step S55, it is determined whether the present image displayed on the display screen 22a is the very last image acquired in time-lapse photographing (step S57). When the image is determined not to be the very last image, 1 is added to the frame number n (step S56), the processing returns to step S53, and the image of the next frame is loaded. On the other hand, when the image is determined to be the very last image, the series of operations of image reproduction processing is ended. With such image reproduction processing, it is possible to reproduce continuously only the images that have a change from the previous image in the order of photographing time of the observation object.

As described hereinabove, in the time-lapse photographing device 1 described in the present embodiment, the image of the observation object S acquired in each photographing timing is compared with a previous image acquired at a photographing timing immediately preceding the photographing timing at which each such image has been acquired, whereby it is determined whether or not there is a change from the previous image in the observation object S for each image acquired at each photographing timing. Moreover, because predetermined identification information is added to any one image from among the image that is determined to have a change from the previous image in the observation object S and the image that is determined to have no change from the previous image in the observation object S, only the image that has a change from the previous image in the observation object S can be extracted from the saved images on the basis of the identification information. As a result, the change state of the observation object S can be viewed by image reproduction. Further, where the images that have no change from the previous image in the observation object S are also extracted and reproduced, it is possible to view the states before and after the change in the observation object S by the reproduced images.

Further, because only the image that has a change from the previous image in the observation object S can be extracted from the saved images based on the identification information, it is easy to refer to data on photographing time contained in data of the images. As a result, when the observation object S changes repeatedly with a fixed period, the calculations of the time in which the changes continue and the continuation time in which there are no changes can be easily performed and the processing speed of observation results can be increased.

Further, in the time-lapse photographing device 1 described in the present embodiment, the images that have a change from the previous images are extracted from the images saved in the image storage unit 25 on the basis of the identification information added to the image, and only these images having a change from the previous images can be continuously reproduced in the order of photographing time of the observation object S. Therefore, it is not necessary to view unimportant images that have no change in the observation object S and time required for processing the observation results can be greatly shortened.

The preferred embodiment of the present invention is described hereinabove, but the scope of the present invention is not limited to the above-described embodiment. For example, the procedures of time-lapse photographing performed with the time-lapse photographing device 1 that are illustrated using the flowcharts shown in FIG. 7 and FIG. 8 or flowcharts shown in FIG. 9 and FIG. 10 are merely examples, and other procedures may be employed, provided that the determination as to whether or not there is a change from the previous image in the observation object S is performed for each image acquired at each photographing timing by comparing the image of the observation object S acquired at each photographing timing with the previous image acquired at a photographing timing immediately preceding the photographing timing at which the respective image has been acquired and that predetermined identification information is added to any image from among the image for which a change from the previous image has been determined to be present in the observation object S and the image for which a change from the previous image has been determined to be absent in the observation object S.

Further, in the above-described embodiment, the time-lapse photographing continuation time is designated as an initial condition and the time-lapse photographing is ended when the time-lapse photographing continuation time elapses, but it is also possible to designate the total number of photographing timings or the total number of shots (total number of images) as the initial condition and end the time-lapse photographing when the number of photographing timings reaches the set value or the total number of shots (total number of images) reaches the set value.

Figure 11:
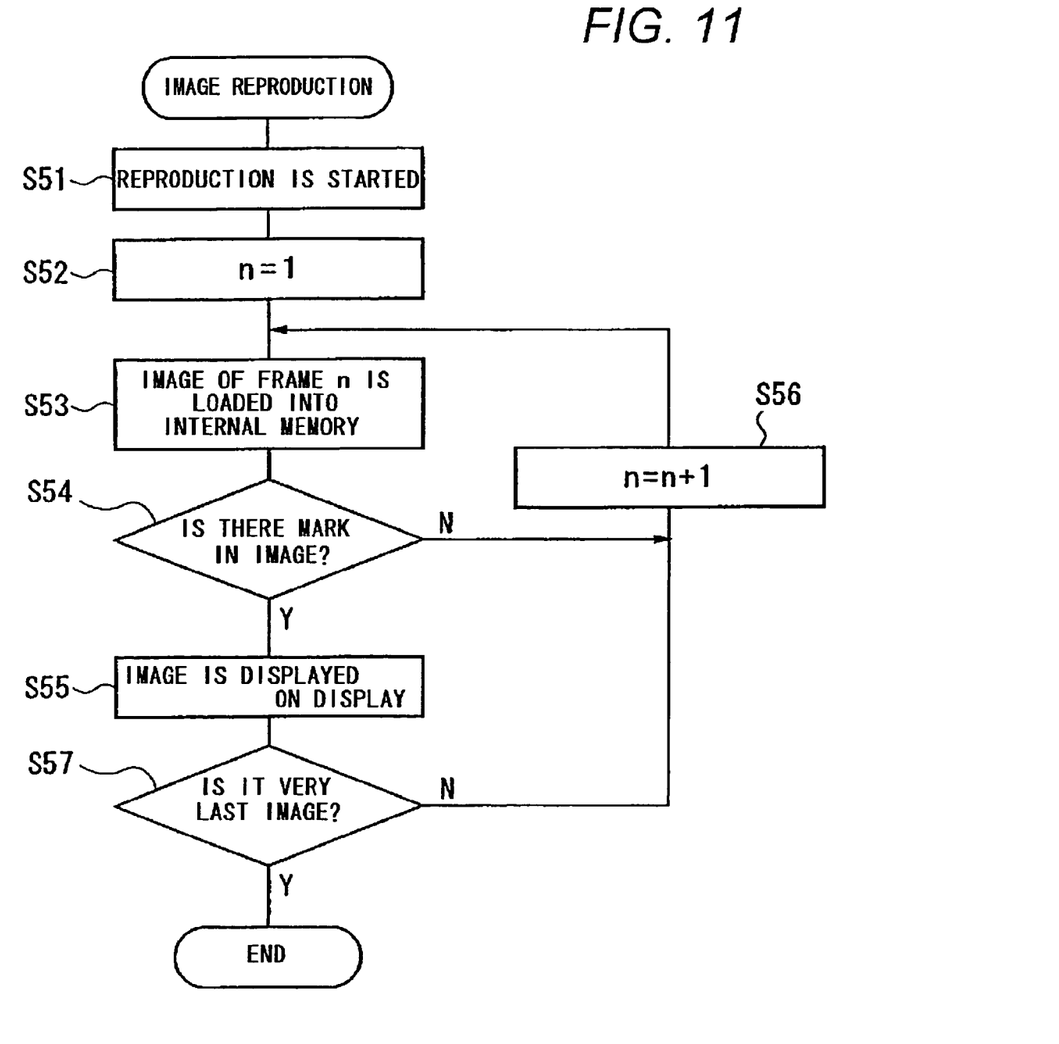
FIG. 11 is a flowchart illustrating a procedure of continuously reproducing only images in which a change from the previous image is present in the observation object, from among the images of the observation object obtained with the time-lapse photographing device.

The image reproduction procedure performed by the time-lapse photographing device 1 that is illustrated using the flowchart shown in FIG. 11 is not limited to the example of procedure in which only the images that have a change from the previous image in the observation object S, from among the images of the observation object that have been time-lapse photographed, are continuously reproduced, and the reproduction of images may be performed by another alternative method. For example, it is possible to produce one set of image data in which the images that have a change from the previous image in the observation object S are arranged side by side in the order of photographing the observation object S (time-lapse photographing advance order) and read the images successively one by one from these image data during image reproduction.

Further, conditions other than those indicated in the above-described embodiment (standby time, time-lapse photographing continuation time, and number of shots) may be also set as the initial conditions preceding the time-lapse photographing. In the above-described embodiment, an example is described in which the time-lapse photographing in accordance with the present invention is applied to a microscope, but this is merely an example, and applications to a camera or telescope are also possible.

What is claimed is:

1. A time-lapse photographing device comprising:
    a photographing element that photographs an observation object;
    an image acquisition unit that controls the photographing element, performs time-lapse photographing intermittently with a predetermined standby time, and acquires a plurality of images at each photographing timing of the time-lapse photographing;
    an image change determination unit that compares an image at the present photographing timing when the image is acquired by the image acquisition unit with an image at a previous timing, thereby determining whether or not there is a change in the acquired image;
    an image extraction unit that extracts at least one representative image from among a group of images for which the presence of a change in the image of the observation object has been determined by the image change determination unit and extracts at least one representative image from among a group of images for which the absence of a change in the image of the observation object has been determined; and
    an image memory that saves, separately for each of the photographing timings, an image at each of the photographing timings extracted by the image extraction unit.

2. The time-lapse photographing device according to claim 1, further comprising an identification information addition unit that adds predetermined identification information to either an image for which a change in the observation object has been determined to be present by the image change determination unit, or an image for which a change in the observation object has been determined to be absent.

3. The time-lapse photographing device according to claim 1, further comprising an image reproduction unit that extracts an image having a change from the previous image from among the images saved in the image memory, based on the identification information added to the image, and continuously reproduces only the images that have a change from the previous image in the order of photographing time of the observation object.

4. The time-lapse photographing device according to claim 3, wherein the image reproduction unit has a first reproduction mode of reproducing only an image having the identification information added thereto and a second reproduction mode of reproducing an image extracted under conditions different from those of the first reproduction mode.

5. The time-lapse photographing device according to claim 1, wherein the image extraction unit extracts all images from a group of images for which the presence of a change in the observation object has been determined by the image change determination unit.

6. The time-lapse photographing device according to claim 1, wherein the image change determination unit successively determines a change in the plurality of images; and
    the image extraction unit extracts an image at a point of time the change is determined to be present and completes a next operation of the image acquisition unit and the image change determination unit.

7. The time-lapse photographing device according to claim 2, further comprising an image reproduction unit that extracts an image having a change from the previous image from among the images saved in the image memory, based on the identification information added to the image, and continuously reproduces only the images that have a change from the previous image in the order of photographing time of the observation object.

8. The time-lapse photographing device according to claim 7, wherein the image reproduction unit has a first reproduction mode of reproducing only an image having the identification information added thereto and a second reproduction mode of reproducing an image extracted under conditions different from those of the first reproduction mode.

* * * * *